United States Patent
Turnbull et al.

(10) Patent No.: US 10,340,761 B2
(45) Date of Patent: Jul. 2, 2019

(54) ELECTRIC DEVICE AND A STATOR ASSEMBLY FOR THE ELECTRIC DEVICE

(71) Applicant: GM GLOBAL TECHNOLOGY OPERATIONS LLC, Detroit, MI (US)

(72) Inventors: Paul F. Turnbull, Canton, MI (US); Edward L. Kaiser, Orion, MI (US); Matthew D. Laba, Oakland, MI (US); Khwaja M. Rahman, Troy, MI (US); Rolf Blissenbach, Rochester Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 638 days.

(21) Appl. No.: 14/669,879

(22) Filed: Mar. 26, 2015

(65) Prior Publication Data

US 2016/0285334 A1 Sep. 29, 2016

(51) Int. Cl.
*H02K 3/28* (2006.01)
*H02K 3/50* (2006.01)

(52) U.S. Cl.
CPC .............. *H02K 3/28* (2013.01); *H02K 3/50* (2013.01)

(58) Field of Classification Search
CPC .. H02K 3/50; H02K 3/12; H02K 3/18; H02K 3/32; H02K 3/325; H02K 3/34; H02K 3/345; H02K 3/46; H02K 3/48; H02K 3/04; H02K 3/28; H02K 3/38
USPC .............. 310/201, 207, 208, 194, 209, 71; 318/538, 539, 540, 541, 542
See application file for complete search history.

(56) References Cited

U.S. PATENT DOCUMENTS

| | | | | |
|---|---|---|---|---|
| 3,774,062 A | * | 11/1973 | Johnson | H02K 3/02 310/12.04 |
| 6,091,231 A | * | 7/2000 | Prunty | H02K 11/046 310/181 |
| 8,350,432 B2 | | 1/2013 | Guedes-Pinto et al. | |
| 2003/0214196 A1 | * | 11/2003 | Cai | H02K 3/12 310/208 |
| 2007/0080590 A1 | * | 4/2007 | Vinson | F04D 25/082 310/58 |
| 2009/0140596 A1 | * | 6/2009 | Kaiser | H02K 3/12 310/201 |

(Continued)

FOREIGN PATENT DOCUMENTS

CN 102577036 B 12/2014
WO 2013051618 A1 4/2013

*Primary Examiner* — Bernard Rojas
*Assistant Examiner* — Robert E Mates
(74) *Attorney, Agent, or Firm* — Quinn IP Law

(57) ABSTRACT

An electric device and a stator assembly for the electric device includes a stator core defining a plurality of slots spaced from each other. The stator assembly includes a plurality of bar conductors disposed in each of the slots and arranged to present a first winding path, a second winding path and a third winding path. A first set of the bar conductors of the first, second and third winding paths are configured to receive current in a parallel circuit arrangement. The stator assembly also includes a plurality of electrical jumpers electrically connected to a predetermined number of the bar conductors such that an amount of current flowing through the first winding path and the third winding path is substantially the same and an amount of current flowing through the second winding path is different from the amount of current flowing through the first and third winding paths.

20 Claims, 5 Drawing Sheets

(56) References Cited

U.S. PATENT DOCUMENTS

| | | | |
|---|---|---|---|
| 2009/0230806 A1* | 9/2009 | Miyata | H02K 3/28 310/195 |
| 2011/0012471 A1* | 1/2011 | Dang | H02K 3/12 310/201 |
| 2012/0119690 A1* | 5/2012 | Nishiyama | H02K 1/146 318/724 |
| 2013/0076175 A1* | 3/2013 | Turnbull | H02K 3/50 310/71 |
| 2014/0167547 A1 | 6/2014 | Hao et al. | |
| 2014/0319953 A1 | 10/2014 | Rahman et al. | |
| 2015/0028713 A1 | 1/2015 | Rahman et al. | |

* cited by examiner

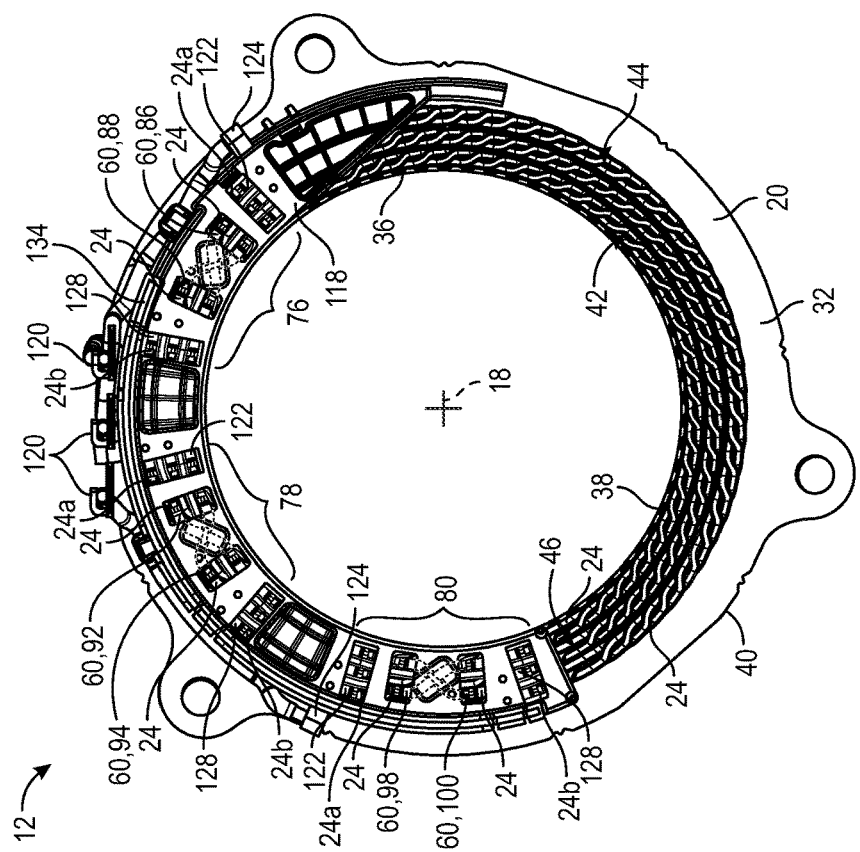

US 10,340,761 B2

ELECTRIC DEVICE AND A STATOR ASSEMBLY FOR THE ELECTRIC DEVICE

TECHNICAL FIELD

The present disclosure relates to an electric device and a stator assembly for the electric device.

BACKGROUND

Electric vehicles can include an electric machine that generates torque. The electric machine can be configured to use AC voltage from an inverter of the vehicle to generate rotational motion. The electric machine can include a rotor and a stator, with the rotor rotatable relative to the stator when the electric machine utilizes the AC voltage. The stator can include a plurality of bar conductors disposed in slots to arrange winding paths in a parallel circuit arrangement that creates a balanced or equal amount of current flowing through each of the winding paths. Each of the winding paths creates a waveform that is exactly the same magnitude and in phase with each other waveform when in a balanced arrangement, which can cause resonance that creates acoustic noise. Furthermore, a balanced arrangement can lead to hot spots in the stator where there is limited access for cooling the stator.

SUMMARY

The present disclosure provides a stator assembly for an electric device. The stator assembly includes a stator core defining a plurality of slots spaced from each other. The stator assembly further includes a plurality of bar conductors disposed in each of the slots and arranged to present a first winding path, a second winding path and a third winding path. A first set of the bar conductors of the first, second and third winding paths are configured to receive current in a parallel circuit arrangement. The stator assembly also includes a plurality of electrical jumpers electrically connected to a predetermined number of the bar conductors such that an amount of current flowing through the first winding path and the third winding path is substantially the same and an amount of current flowing through the second winding path is different from the amount of current flowing through the first and third winding paths.

The present disclosure also provides an electric device including a housing and a rotor rotatably supported by the housing. The electric device also includes a stator assembly supported by and fixed relative to the housing. The stator assembly includes a stator core defining a plurality of slots spaced from each other. The stator assembly also includes a plurality of bar conductors disposed in each of the slots and arranged to present a first winding path, a second winding path and a third winding path. A first set of the bar conductors of each of the first, second and third winding paths are configured to receive current in a parallel circuit arrangement. The stator assembly further includes a plurality of electrical jumpers electrically connected to a predetermined number of the bar conductors such that an amount of current flowing through the first winding path and the third winding path is substantially the same and an amount of current flowing through the second winding path is different from the amount of current flowing through the first and third winding paths.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 3 is a schematic exploded perspective view of a connection support structure compatible with a stator core.

FIG. 5 is a schematic top view of the stator assembly of FIGS. 2 and 3.

DETAILED DESCRIPTION

Those having ordinary skill in the art will recognize that directional references such as "above", "below", "upward", "up", "downward", "down", "top", "bottom", "left", "right", "back", "forth", etc., are used descriptively for the figures to aid the reader's understanding of the present disclosure, and do not create limitations, particularly as to the position, orientation, use of the disclosure or scope as defined by the appended claims. Furthermore, the term "substantially" can refer to a slight imprecision or slight variance of a condition, quantity, value, or dimension, etc., some of which that are within manufacturing variance or tolerance ranges.

Figure 1:
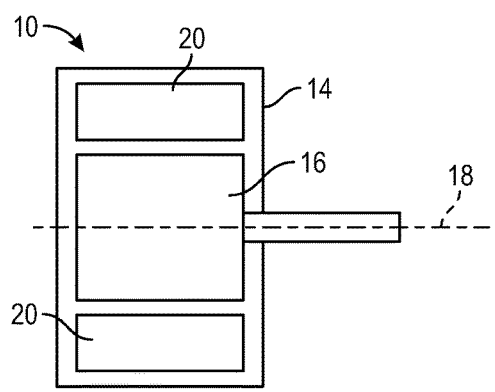
FIG. 1 is a schematic plan view of an electric device.

Referring to the Figures, wherein like numerals indicate like or corresponding parts throughout the several views, an electric device 10 and a stator assembly 12 for the electric device 10 is generally shown in FIG. 1. Therefore, the electric device 10 can include the stator assembly 12.

The electric device 10 can be utilized in a vehicle. The vehicle can be a passenger compartment vehicle or commercial vehicle. For example, the vehicle can be a battery electric vehicle, a hybrid electric vehicle including a plug-in hybrid electric vehicle, an extended range electric vehicle or any other suitable vehicles.

The electric device 10 can include, but is not limited to, an electric motor, a traction motor or other similar device. For example, the electric device 10 can be a permanent magnet motor, an induction motor, synchronous motor, etc. The electric device 10 can include any device configured to generate an electric machine torque by, for example, converting electrical energy into rotational motion. The electric device 10 can be configured to receive electrical energy from a power source, such as a battery array. The power source can be configured to store and output electrical energy.

The vehicle can include an inverter for converting the direct current (DC) voltage from the battery array into alternating current (AC) voltage. The electric device 10 can be configured to use the AC voltage from the inverter to generate rotational motion. The electric device 10 can also be configured to generate electrical energy when provided with mechanical energy, such as the mechanical energy (torque) of an engine.

Referring to FIG. 1, the electric device 10 can include a housing 14. The housing 14 can be manufactured from any suitable material, including but not limited to aluminum, and can include any suitable size, shape and/or configuration suitable to house the internal components of the electric device 10, some of which are discussed below. For example, the stator assembly 12 is supported by the housing 14. Specifically, the stator assembly 12 is fixed relative to the housing 14. In other words, the stator assembly 12 is stationary relative to the housing 14.

Figure 2:
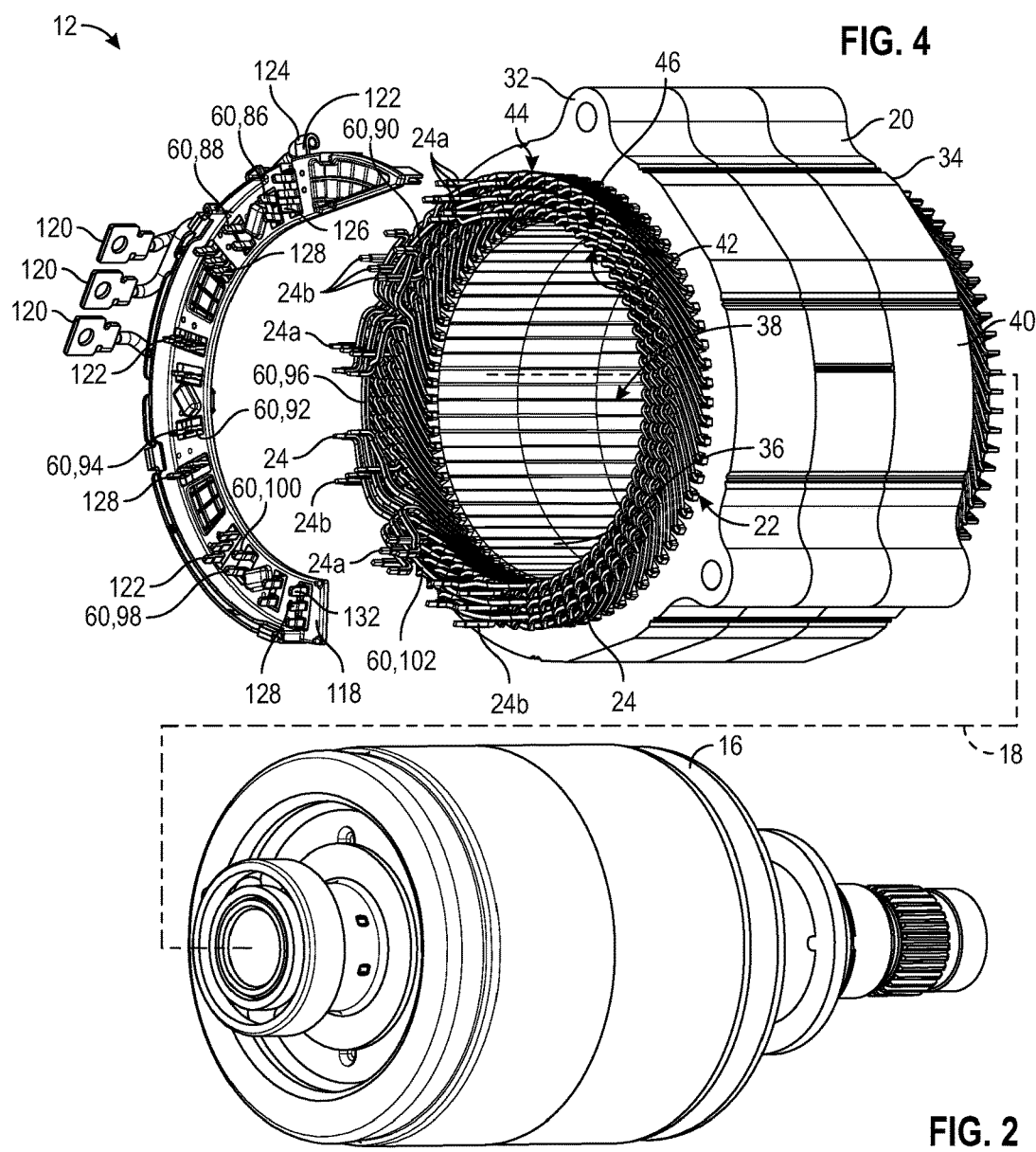
FIG. 2 is a schematic partially exploded perspective view of a stator assembly and a rotor.

Turning to FIGS. 1 and 2, the electric device 10 also includes a rotor 16 rotatably supported by the housing 14. The rotor 16 is rotatable relative to the stator assembly 12 about a longitudinal axis 18. The rotor 16 can include, for example, windings or permanent magnets that interact with the poles of the stator assembly 12 to generate rotation of the rotor 16 relative to the stator assembly 12. The rotor 16 can be an interior permanent magnet, a surface permanent magnet, an induction, synchronous, reluctance or a separately-excited/wound-field rotor. The rotor 16 is shown schematically in FIGS. 1 and 2 for illustrative purposes only.

Figure 4:
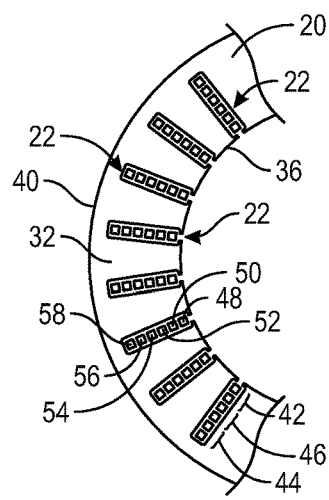
FIG. 4 is a fragmentary end view of the stator core defining a plurality of slots.

Referring to FIGS. 3 and 4, the stator assembly 12 further includes a stator core 20 defining a plurality of slots 22 (see FIG. 4) spaced from each other. The stator assembly 12 also includes a plurality of bar conductors 24 (see FIGS. 2, 3 and 5) disposed in each of the slots 22 and arranged to present a first winding path, a second winding path and a third winding path. A first set of the bar conductors 24a of the first, second and third winding paths are configured to receive current in a parallel circuit arrangement. Therefore, current entering the first, second and third winding paths are in a parallel electrical circuit, not a series circuit arrangement. Said differently, the same voltage potential enters the first, second and third winding paths. The location of the first set of the bar conductors 24a of the first, second and third winding paths can be different for the two embodiments discussed herein. The electric device 10 can operate in response to voltage applied to the winding paths from the inverter, which creates torque-producing current in the winding paths which causes the rotor 16 to rotate. The bar conductors 24 are sometimes referred to as hairpin conductors, and can be a substantially rectangular cross-section.

Referring to FIG. 2, the stator core 20 extends between a first end 32 and a second end 34 along the longitudinal axis 18. The slots 22 are spaced from each other radially about the longitudinal axis 18 and each extends between the first and second ends 32, 34 of the stator core 20. Therefore, the slots 22 can extend lengthwise along the longitudinal axis 18. In certain embodiments, there are exactly seventy-two slots 22 defined in the stator core 20 and the stator core 20 defines eight poles.

As best shown in FIG. 2, the stator core 20 can include an inner wall 36 defining a hole 38 along the longitudinal axis 18 such that the inner wall 36 is spaced radially away from the longitudinal axis 18. The rotor 16 is disposed in the hole 38 of the stator core 20 and is rotatable relative to the inner wall 36 of the stator core 20 when current is traveling through the stator core 20. Furthermore, the slots 22 can intersect the inner wall 36.

Turning to FIG. 5, the stator core 20 can also include an outer wall 40 opposing the inner wall 36. Therefore, the inner wall 36 and the outer wall 40 are spaced from each other transverse to the longitudinal axis 18. As such, the inner wall 36 defines an inner diameter and the outer wall 40 defines an outer diameter greater than the inner diameter. The diameter of the stator core 20 increases in size from the inner wall 36 outwardly to the outer wall 40.

Continuing with FIG. 5, each of the slots 22 can include an inner layer 42 of the bar conductors 24 disposed proximal to the inner wall 36, an outer layer 44 of the bar conductors 24 disposed proximal to the outer wall 40 and spaced from the inner layer 42. Furthermore, each of the slots 22 can include a middle layer 46 of the bar conductors 24 disposed between the inner and outer layers 42, 44.

Figure 6:
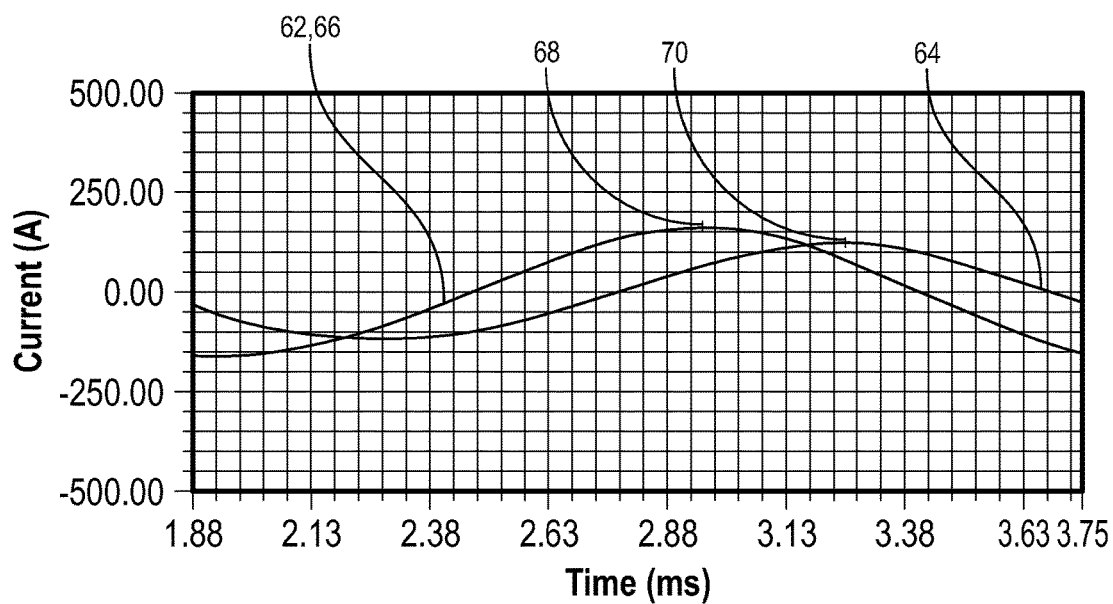
FIG. 6 is a schematic chart of one embodiment of a first waveform and a third waveform being out of phase from a second waveform.
Figure 7:
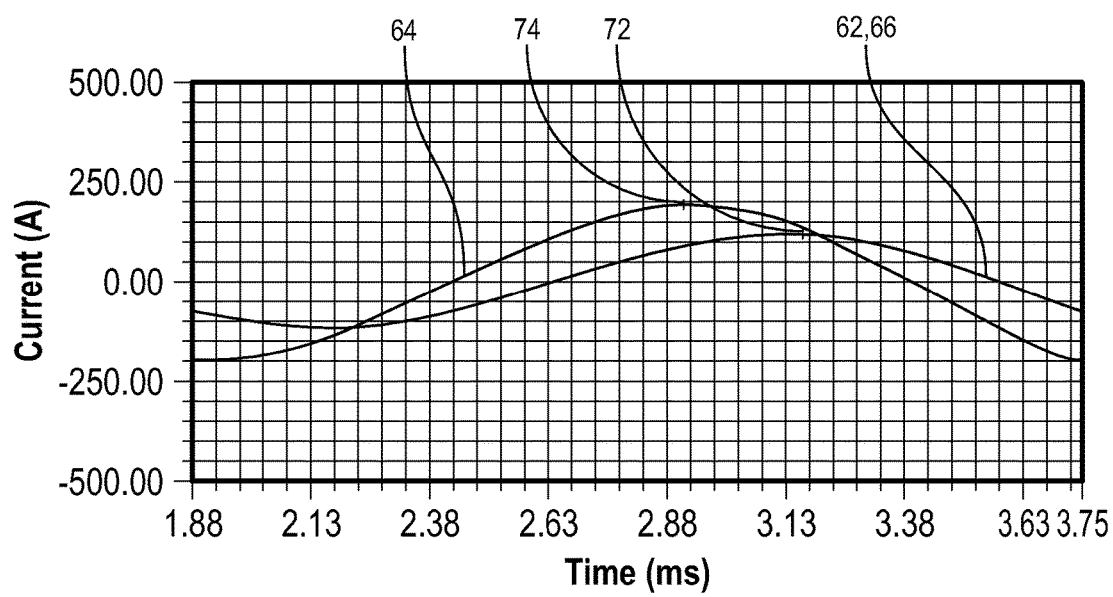
FIG. 7 is a schematic chart of another embodiment of the first waveform and the third waveform being out of phase from the second waveform.
Figure 8:
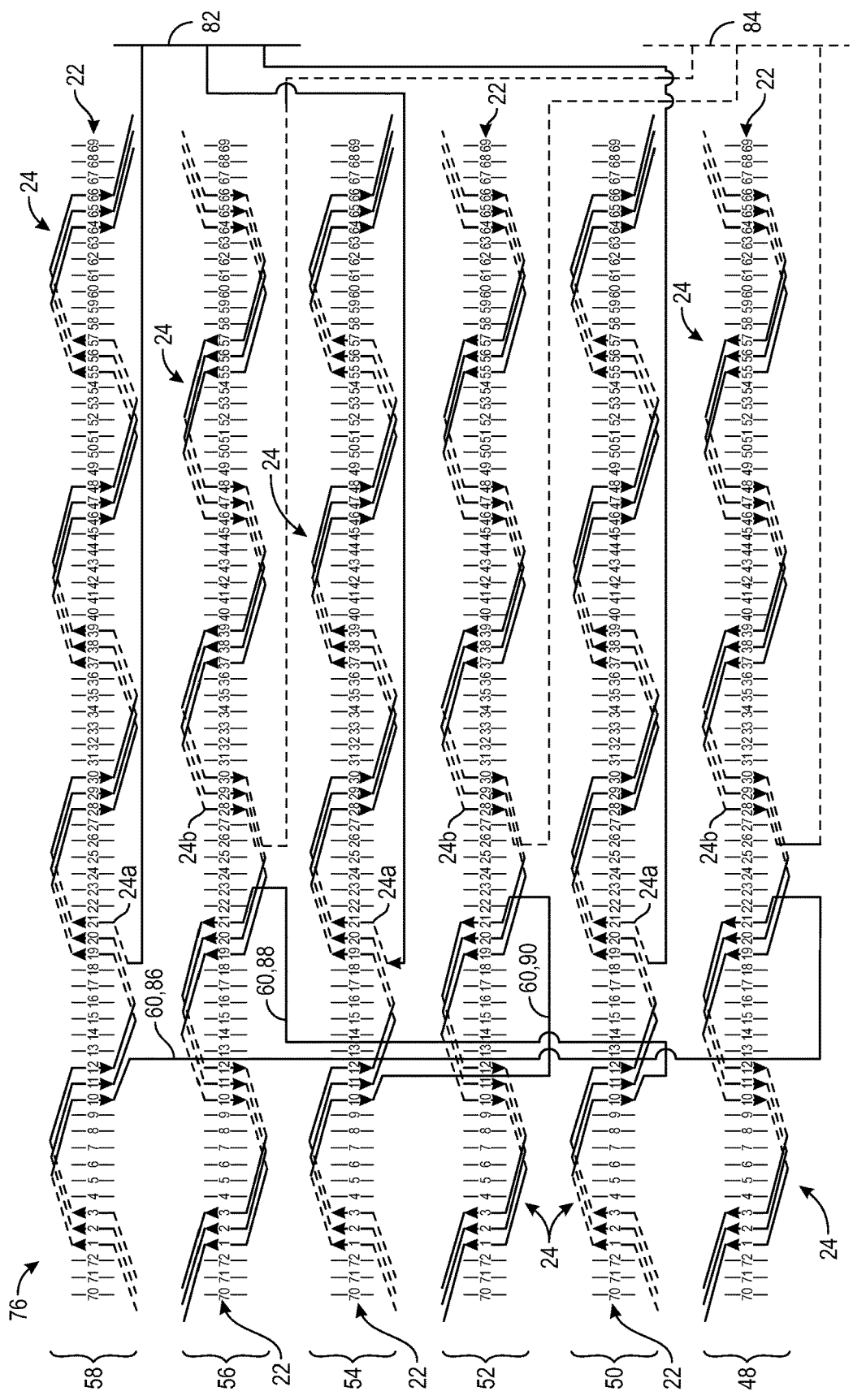
FIG. 8 is a schematic wiring diagram of one embodiment for a plurality of winding paths for a U phase.

For the embodiment of FIGS. 6 and 8, generally, a combination of certain bar conductors 24 of the inner and outer layers 42, 44 are associated with the first and third winding paths, and certain bar conductors 24 of the middle layer 46 are associated with the second winding path. Furthermore, for the embodiment of FIGS. 6 and 8, current enters the first winding path through the inner layer 42, current enters the second winding path through the middle layer 46 and current enters the third winding path through the outer layer 44. As will be discussed further below, for the embodiment of FIGS. 7 and 9, generally, a combination of certain bar conductors 24 of the inner, outer and middle layers 42, 44, 46 are associated with the first and third winding paths, and a combination of certain bar conductors 24 of the inner and middle layers 42, 44 are associated with the second winding path. Furthermore, for the embodiment of FIGS. 7 and 9, current enters the first and third winding paths through the outer layer 44 and current enters the second winding path through the middle layer 46.

Generally, the current that travels through the inner layer 42 is proximal to the inner diameter of the inner wall 36 to present a first distance of travel, and creates a first magnetic flux in the inner layer 42. Additionally, the current that travels through the middle layer 46 which is spaced between the inner and outer walls 36, 40 presents a second distance of travel that is greater than the first distance of travel, and creates a second magnetic flux in the middle layer 46 which is different from the first magnetic flux. Furthermore, the current that travels through the outer layer 44 is proximal to the outer diameter of the outer wall 40 to present a third distance of travel that is greater than the first distance of travel and the second distance of travel, and creates a third magnetic flux in the outer layer 44 which is different from the first and second magnetic fluxes. Therefore, when current, such as alternating current, flows through the inner layer 42 which is proximal to the inner wall 36 and is traveling around the stator core 20 at a smaller diameter than the middle and outer layers 46, 44, the distance that the current travels is smaller than the distance that the current travels for the outer layer 44 due to the outer layer 44 being proximal to the outer wall 40 and a larger diameter. As such, the inductance that the alternating current experiences in the inner layer 42 is different from the inductance in the outer and middle layers 44, 46. Therefore, the different distances of travel of the current around the stator core 20 and the different inductances of the inner, outer and middle layers 42, 44, 46 creates differences in the impedance of the layers 42, 44, 46. However, with the connections of the various bar conductors 24 of the various layers 42, 44, 46, which is described further below, the differences in the impedance can be reduced or minimized.

Referring to FIG. 4, the inner layer 42 of each of the slots 22 can include a first layer 48 and a second layer 50. The middle layer 46 of each of the slots 22 can include a third layer 52 and a fourth layer 54. The outer layer 44 of each of the slots 22 can include a fifth layer 56 and a sixth layer 58. The first, second, third, fourth, fifth and sixth layers 48, 50, 52, 54, 56, 58 are arranged in a row from the inner wall 36 outwardly to the outer wall 40 such that the first layer 48 is disposed proximal to the inner wall 36 and the sixth layer 58 is disposed proximal to the outer wall 40. Therefore, each of the slots 22 includes six layers 48, 50, 52, 54, 56, 58. The stator assembly 12 can include an insulator disposed between each of the bar conductors 24 of each of the slots 22 to prevent an undesirable electrical connection between the bar conductors 24 of the layers 48, 50, 52, 54, 56, 58 in the same slot 22, i.e., to prevent a short circuit.

As best shown in FIGS. 2, 3 8 and 9, the stator assembly 12 also includes a plurality of electrical jumpers 60 electrically connected to a predetermined number of the bar conductors 24 such that an amount of current flowing through the first winding path and the third winding path is substantially the same. In other words, the amount of current that flows through the first and third winding paths is substantially balanced, i.e., substantially the same amount (also see FIGS. 6 and 7). Continuing with FIGS. 6 and 7, the amount of current flowing through the second winding path is different from the amount of current flowing through the first and third winding paths. Therefore, the arrangement of the stator core 20 is partially unbalanced due to the amount of current flowing through the second winding path being different from the first and third winding paths. The charts of FIGS. 6 and 7 are labeled in the units of ampere (A) for current verse millisecond (ms) for time.

In certain embodiments, referring to FIG. 6, the amount of current flowing through each of the first and third winding paths is greater than the amount of current flowing through the second winding path. Therefore, the amount of current flowing through the inner and outer layers 42, 44 is greater than the amount of current flowing through the middle layer 46. Since the electrical jumpers 60 electrically connect certain bar conductors 24 of the inner and outer layers 42, 44 of this embodiment, the flux of the inner and outer layers 42, 44 are substantially the same, i.e. substantially balanced, which also substantially balances the impedance of these layers 42, 44. Heat being produced in the first and third winding paths is greater than the heat being produced in the second winding path due to the amount of current flowing through the first and third winding paths being greater than the amount of current flowing through the second winding path. Therefore, more heat is produced in the inner and outer layers 42, 44 than the middle layer 46 of this embodiment due to the greater amount of current flowing through those layers 42, 44, but the inner and outer layers 42, 44 are readily cooled due to the location of the inner layer 42 being adjacent to the inner wall 36 and the outer layer 44 being adjacent to the outer wall 40. Therefore, coolant lines, filled with coolant fluid, can be disposed proximal to the inner wall 36 and the outer wall 40 to cool the inner and outer layers 42, 44 of this embodiment. Since the middle layer 46 is naturally cooler than the inner and outer layers 42, 44, hot spots will be minimized. As such, the arrangement of the stator assembly 12 that produces the waveforms 62, 64, 66 of FIG. 6, which are discussed in detail below, has improved thermal performance.

In other embodiments, referring to FIG. 7, the amount of current flowing through each of the first and third winding paths is less than the amount of current flowing through the second winding path. Therefore, the amount of current flowing through the inner, outer and middle layers 42, 44, 46 that create the first and third winding paths are less than the amount of current flowing through the inner and middle layers 42, 46 that create the second winding path. Since the electrical jumpers 60 electrically connect certain bar conductors 24 of the inner, outer and middle layers 42, 44, 46 to create the first and third winding paths of this embodiment, the flux of the inner, outer and middle layers 42, 44, 46 of the first and third winding paths are substantially the same, i.e. substantially balanced, which also substantially balances the impedance of these layers 42, 44, 46 of the first and third winding paths.

Referring to FIGS. 6 and 7, the amount of current flowing through the first winding path creates a first waveform 62, the amount of current flowing through the second winding path creates a second waveform 64 and the amount of current flowing through the third winding path creates a third waveform 66. As shown in FIGS. 6 and 7, the first and third waveforms 62, 66 are substantially the same and the second waveform 64 is different from the first and third waveforms 62, 66. As such, the second waveform 64 of the current flowing through the second winding path has a phase shift from the first and third waveforms 62, 66 of the current flowing through the first and third winding paths. By creating the phase shift, acoustic noise is minimized because the frequency of the waveforms 62, 64, 66 are spread out. The waveforms 62, 64, 66 illustrated in FIGS. 6 and 7 are for illustrative purposes only and the waveforms 62, 64, 66 can have small variations than illustrated.

As discussed above for FIG. 6, the amount of current flowing through each of the first and third winding paths is greater than the amount of current flowing through the second winding path. As shown in FIG. 6, a peak amplitude 68 of the first and third waveforms 62, 66 occurs in time before a peak amplitude 70 of the second waveform 64 such that the first and third waveforms 62, 66 are different from the second waveform 64.

The peak amplitude 70 of the current flowing through the second winding path of FIG. 6 is less than the peak amplitude 68 of current flowing through the other winding paths, which creates the partially unbalanced winding. Furthermore, the peak amplitude 70 of the current flowing through the second winding path of FIG. 6 is out of phase from the peak amplitude 68 of the current flowing through the first and third winding paths, which as discussed above, minimizes acoustic noise. In other words, as shown in FIG. 6, there is a phase shift between the peak amplitude 70 of the current flowing through the second winding path and the peak amplitude 68 of the current flowing through the first and third winding paths.

As also discussed above for FIG. 7, the amount of current flowing through each of the first and third winding paths is less than the amount of current flowing through the second winding path. Therefore, as shown in FIG. 7, a peak amplitude 72 of the first and third waveforms 62, 66 occurs in time after a peak amplitude 74 of the second waveform 64 such that the first and third waveforms 62, 66 are different from the second waveform 64. The amount of current flowing through the second winding path of FIG. 7 is greater than the amount of current flowing through the other winding paths, which creates the partially unbalanced winding. Furthermore, the peak amplitude 74 of the current flowing through the second winding path of FIG. 7 is out of phase from the peak amplitude 72 of the current flowing through the first and third winding paths, which as discussed above, minimizes acoustic noise. In other words, as shown in FIG. 7, there is a phase shift between the peak amplitude 74 of the current flowing through the second winding path and the peak amplitude 72 of the current flowing through the first and third winding paths.

Figure 9:
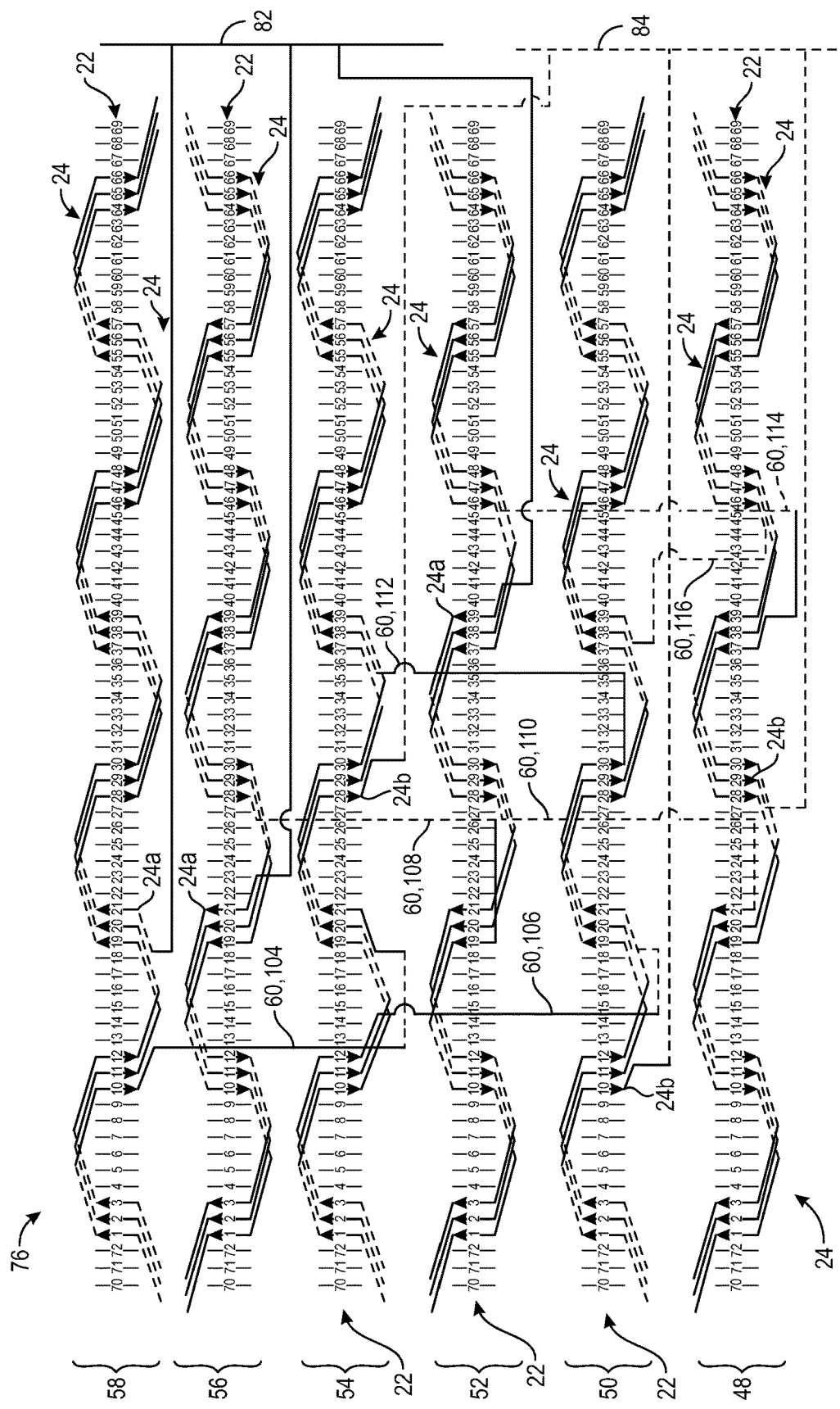
FIG. 9 is a schematic wiring diagram of another embodiment for a plurality of winding paths for a U phase.

Turning back to the electrical jumpers 60, as best shown in FIGS. 3, 8 and 9, a plurality of electrical jumpers 60 are illustrated and are attached to certain bar conductors 24 to create substantially the same amount of current flowing through the first and third winding paths and different current flowing through the second winding path. The first, second and third winding paths create a three phase electric device 10 having a U phase 76, a V phase 78 and a W phase 80. Therefore, current in the U phase 76 is split into the first, second and third winding paths, and the electrical jumpers 60 connect to certain bar conductors 24 of certain layers 42, 44, 46 such that the current in the U phase 76 travels around the stator core 20 in a particular arrangement. Similarly, current in the V phase 78 is split into the first, second and third winding paths, and other electrical jumpers 60 connect to certain bar conductors 24 of certain layers 42, 44, 46 such that the current in the V phase 78 travels around the stator core 20 in a particular arrangement. Furthermore, current in the W phase 80 is split into the first, second and third winding paths, and yet other electrical jumpers 60 connect to certain bar conductors 23 of certain layers 42, 44, 46 such that the current in the W phase 80 travels around the stator core 20 in a particular arrangement.

Referring to FIGS. 8 and 9, the schematic diagrams of two winding layouts are illustrated for the U phase 76. The winding layout of FIG. 8 corresponds to the waveforms 62, 64, 66 produced in FIG. 6 and the winding layout of FIG. 9 corresponds to the waveforms 62, 64, 66 produced in FIG. 7. The winding layouts for the V phase 78 and the W phase 80 are similar to the U phase 76 of these respective winding layouts, with the electrical jumpers 60 shifted to different slots 22, and therefore, the winding layouts are not illustrated. The basic structure of the rotor 16, the stator core 20 with bar conductors 24 disposed in the layers 42, 44, 46 and the slots 22 of the stator core 20, as described above, are the same for both FIGS. 8 and 9, with the differences between FIGS. 8 and 9 being the specific connection locations of the electrical jumpers 60.

The diagrams of FIGS. 8 and 9, illustrate the first through sixth layers 48, 50, 52, 54, 56, 58 for each of the seventy-two slots 22 of the stator core 20. FIGS. 8 and 9 also illustrate how many slots 22 each of the bar conductors 24 span across. Said differently, each of the bar conductors 24 span a predetermined number of slots 22 as illustrated in FIGS. 8 and 9, and all of the bar conductors 24 can be an identical span. In addition, FIGS. 8 and 9 illustrates a start connection 82 in which current from the inverter enters the first set of bar conductors 24a and then travels around the stator core 20, and an end connection 84 in which current exits a second set of bar conductors 24b and exits the stator core 20. Therefore, for both embodiments, current enters the stator core 20 through the first set of the bar conductors 24a in the parallel circuit arrangement and the current exits the stator core 20 through the second set of bar conductors 24b.

The arrangement of the electrical jumpers 60 for FIG. 8, which will be discussed in detail below, electrically connects a certain number of the bar conductors 24 together such that the amount of current flowing through the inner and outer layers 42, 44 is substantially the same, while the amount of current flowing through the middle layer 46 is different from the amount of current flowing through the inner and outer layers 42, 44. Therefore, for FIG. 8, various electrical jumpers 60 are electrically connected to a predetermined number of the bar conductors 24 such that the amount of current flowing through the first winding path and the third winding path is substantially the same, and the amount of current flowing through the second winding path is different from the amount of current flowing through the first and third winding paths. The arrangement of the electrical jumpers 60 discussed below for FIG. 8 is for illustrative purposes only and other arrangements are possible.

Referring to FIG. 8, a first one of the electrical jumpers 86 is secured to the bar conductor 24 of the first layer 48 of one of the slots 22. In addition, the first one of the electrical jumpers 86 is secured to the bar conductor 24 of the sixth layer 58 of another one of the slots 22 to cross the current between the inner and outer layers 42, 44. Specifically, as shown in FIG. 8, one end of the first one of the electrical jumpers 86 is secured to the bar conductor 24 of the first layer 48 of the twenty-first slot 22 and another end of the first one of the electrical jumpers 86 is secured to the bar conductor 24 of the sixth layer 58 of the tenth slot 22. The first one of the electrical jumpers 86 connects the inner and outer layers 42, 44 to form the first winding path.

Continuing with FIG. 8, a second one of the electrical jumpers 88 is secured to the bar conductor 24 of the second layer 50 in the same slot 22 that has the first one of the electrical jumpers 86 secured to the bar conductor 24 of the sixth layer 58. Additionally, the second one of the electrical jumpers 88 is secured to the bar conductor 24 of the fifth layer 56 in the same slot 22 that has the first one of the electrical jumpers 86 secured to the bar conductor 24 of the first layer 48 to cross the current between the inner and outer layers 42, 44. Specifically, as shown in FIG. 8, one end of the second one of the electrical jumpers 88 is secured to the bar conductor 24 of the second layer 50 of the tenth slot 22 and another end of the second one of the electrical jumpers 88 is secured to the bar conductor 24 of the fifth layer 56 in the twenty-first slot 22. The second one of the electrical jumpers 88 connects the inner and outer layers 42, 44 to form the third winding path.

Again continuing with FIG. 8, a third one of the electrical jumpers 90 is secured to the bar conductor 24 of the fourth layer 54 in the same slot 22 that has the first one of the electrical jumpers 86 secured to the bar conductor 24 of the sixth layer 58. In addition, the third one of the electrical jumpers 90 is secured to the bar conductor 24 of the third layer 52 in the same slot 22 that has the first one of the electrical jumpers 86 secured to the bar conductor 24 of the first layer 48. Therefore, the third one of the electrical jumpers 90 maintains the current in the middle layer 46. Specifically, as shown in FIG. 8, one end of the third one of the electrical jumpers 90 is secured to the bar conductor 24 of the fourth layer 54 of the tenth slot 22 and another end of the third one of the electrical jumpers 90 is secured to the bar conductor 24 of the third layer 52 in the twenty-first slot 22. The third one of the electrical jumpers 90 connects the middle layer 46 to form the second winding path.

FIG. 3 illustrates the first, second and third one of the electrical jumpers 86, 88, 90, which are duplicated twice in different slot 22 locations about the stator core 20 as shown in FIG. 3. Therefore, the stator assembly 12 can further include a fourth one of the electrical jumpers 92, a fifth one of the electrical jumpers 94, a sixth one of the electrical jumpers 96, a seventh one of the electrical jumpers 98, an eighth one of the electrical jumpers 100 and a ninth one of the electrical jumpers 102. The fourth and fifth one of the electrical jumpers 92, 94 crosses the current between the inner and outer layers 42, 44. Similarly, the seventh and eighth one of the electrical jumpers 98, 100 crosses the current between the inner and outer layers 42, 44. The sixth and ninth one of the electrical jumpers 96, 102 maintains the current in the middle layer 46. Therefore, the location of the electrical jumpers 60 of FIGS. 2, 3, 5 and 8 correspond to the same embodiment.

The arrangement of the electrical jumpers 60 for the U phase 76 as discussed above for FIG. 8 is repeated for the V phase 78 with all of the slot 22 numbers increased by 120 electrical degrees. For the seventy-two slot 22, eight pole embodiment compatible with FIG. 8, the 120 electrical degrees is equal to an increase of six slots 22. Therefore, the location of the fourth, fifth and sixth one of the electrical jumpers 92, 94, 96, which is utilized for the V phase 78, is shifted by six slots 22. Additionally, the arrangement of the electrical jumpers 60 for the U phase 76 discussed above for FIG. 8 is repeated for the W phase 80 with all of the slot 22 numbers increased by 240 electrical degrees. For the seventy-two slot 22, eight pole embodiment compatible with FIG. 8, the 240 electrical degrees is equal to an increase of twelve slots 22. Therefore, the location of the seventh, eighth and ninth one of the electrical jumpers 98, 100, 102, which is utilized for the W phase 80, is shifted by twelve slots 22.

Three sets of three electrical jumpers 86, 88, 90, 92, 94, 96, 98, 100, 102 can be utilized to direct the current through the first, second and third winding paths in the respective U phase 76, V phase 78 and W phase 80. For example, the first, second and third one of the electrical jumpers 86, 88, 90 are located about the stator core 20 to direct the current flowing through the first, second and third winding paths in the U phase 76. Similarly, the fourth, fifth and sixth one of the electrical jumpers 92, 94, 96 are located about the stator core 20 to direct the current flowing through the first, second and third winding paths in the V phase 78. Furthermore, the seventh, eighth and ninth one of the electrical jumpers 98, 100, 102 are located about the stator core 20 to direct the current flowing through the first, second and third winding paths in the W phase 80. It is to be appreciated that the sets of three electrical jumpers 60 can be arranged differently than discussed immediately above, and the U, V, and W phases 76, 78, 80 can be arranged differently than discussed immediately above, and this is one suitable example.

Turning to FIG. 9, another arrangement of the electrical jumpers 60 are illustrated for the U phase 76. The arrangement of the electrical jumpers 60 for this embodiment, as discussed in detail below, electrically connects a certain number of the bar conductors 24 together such that the amount of current flowing through the inner, outer and middle layers 42, 44, 46 of the first and third winding paths is substantially the same, while the amount of current flowing through the inner and middle layers 42, 46 of the second winding path is different from the amount of current flowing through the first and third winding paths. Therefore, for FIG. 9, various electrical jumpers 60 are electrically connected to a predetermined number of the bar conductors 24 such that the amount of current flowing through the first winding path and the third winding path is substantially the same, and the amount of current flowing through the second winding path is different from the amount of current flowing through the first and third winding paths. The arrangement of the electrical jumpers 60 discussed below for FIG. 9 is for illustrative purposes only and other arrangements are possible. As mentioned above, the first, second and third winding paths create a three phase electric device 10 having the U phase 76, the V phase 78 and the W phase 80.

Referring to FIG. 9, a first one of the electrical jumpers 104 is secured to the bar conductor 24 of the sixth layer 58 of one of the slots 22. In addition, the first one of the electrical jumpers 104 is secured to the bar conductor 24 of the fourth layer 54 of another one of the slots 22 to cross the current between the outer and middle layers 44, 46. Specifically, as shown in FIG. 9, one end of the first one of the electrical jumpers 104 is secured to the bar conductor 24 of the sixth layer 58 of the tenth slot 22 and another end of the first one of the electrical jumpers 104 is secured to the bar conductor 24 of the fourth layer 54 of the twenty-first slot 22.

Continuing with FIG. 9, a second one of the electrical jumpers 106 is secured to the bar conductor 24 of the fourth layer 54 in a different slot 22 from the first one of the electrical jumpers 104. Additionally, the second one of the electrical jumpers 106 is secured to the bar conductor 24 of the second layer 50 in a different slot 22 from the first one of the electrical jumpers 104 to cross the current between the inner and middle layers 42, 46. Specifically, as shown in FIG. 9, one end of the second one of the electrical jumpers 106 is secured to the bar conductor 24 of the fourth layer 54 of the twelfth slot 22 and another end of the second one of the electrical jumpers 106 is secured to the bar conductor 24 of the second layer 50 in the twentieth slot 22. The first and second one of the electrical jumpers 104, 106 respectively connect the outer layer 44 and the middle layer 46, and connects the inner layer 42 and the middle layer 46 to form the first winding path.

Again continuing with FIG. 9, a third one of the electrical jumpers 108 is secured to the bar conductor 24 of the third layer 52 in a different slot 22 than the first one of the electrical jumpers 104 and the second one of the electrical jumpers 106. In addition, the third one of the electrical jumpers 108 is secured to the bar conductor 24 of the fifth layer 56 in a different slot 22 than the first one of the electrical jumpers 104 and the second one of the electrical jumpers 106 to cross the current between the outer and middle layers 44, 46. Specifically, as shown in FIG. 9, one end of the third one of the electrical jumpers 108 is secured to the bar conductor 24 of the third layer 52 of the nineteenth slot 22 and another end of the third one of the electrical jumpers 108 is secured to the bar conductor 24 of the fifth layer 56 in the twenty-eighth slot 22.

Again continuing with FIG. 9, a fourth one of the electrical jumpers 110 is secured to the bar conductor 24 of the first layer 48 in the same slot 22 as one end of the first one of the electrical jumpers 104. In addition, the fourth one of the electrical jumpers 110 is secured to the bar conductor 24 of the third layer 52 in the same slot 22 as one end of the third one of the electrical jumpers 108 to cross the current between the inner and middle layers 42, 46. Specifically, as shown in FIG. 9, one end of the fourth one of the electrical jumpers 110 is secured to the bar conductor 24 of the first layer 48 of the twenty-first slot 22 and another end of the fourth one of the electrical jumpers 110 is secured to the bar conductor 24 of the third layer 52 in the twenty-eighth slot 22. The third and fourth one of the electrical jumpers 108, 110 respectively connect the outer layer 44 and the middle layer 46, and connects the inner layer 42 and the middle layer 46 to form the third winding path.

Again continuing with FIG. 9, a fifth one of the electrical jumpers 112 is secured to the bar conductor 24 of the second layer 50 in a different slot 22 than the first, second, third and fourth one of the electrical jumpers 104, 106, 108, 110. In addition, the fifth one of the electrical jumpers 112 is secured to the bar conductor 24 of the fourth layer 54 in a different slot 22 than the first, second, third and fourth one of the electrical jumpers 104, 106, 108, 110 to cross the current between the inner and middle layers 42, 46. Specifically, as shown in FIG. 9, one end of the fifth one of the electrical jumpers 112 is secured to the bar conductor 24 of the second layer 50 of the thirtieth slot 22 and another end of the fifth one of the electrical jumpers 112 is secured to the bar conductor 24 of the fourth layer 54 in the thirty-eighth slot 22.

Again continuing with FIG. 9, a sixth one of the electrical jumpers 114 is secured to the bar conductor 24 of the first layer 48 in a different slot 22 than the first, second, third, fourth and fifth one of the electrical jumpers 104, 106, 108, 110, 112. In addition, the sixth one of the electrical jumpers 114 is secured to the bar conductor 24 of the third layer 52 in a different slot 22 than the first, second, third, fourth and fifth one of the electrical jumpers 104, 106, 108, 110, 112 to cross the current between the inner and middle layers 42, 46. Specifically, as shown in FIG. 9, one end of the sixth one of the electrical jumpers 114 is secured to the bar conductor 24 of the first layer 48 of the thirty-seventh slot 22 and another end of the sixth one of the electrical jumpers 114 is secured to the bar conductor 24 of the third layer 52 in the forty-seventh slot 22.

Again continuing with FIG. 9, a seventh one of the electrical jumpers 116 is secured to the bar conductor 24 of the second layer 50 in a different slot 22 than the first, second, third, fourth, fifth and sixth one of the electrical jumpers 104, 106, 108, 110, 112, 114. In addition, the seventh one of the electrical jumpers 116 is secured to the bar conductor 24 of the first layer 48 in a different slot 22 than the first, second, third, fourth, fifth and sixth one of the electrical jumpers 104, 106, 108, 110, 112, 114 to maintain the current in the inner layer 42. Specifically, as shown in FIG. 9, one end of the seventh one of the electrical jumpers 116 is secured to the bar conductor 24 of the second layer 50 of the thirty-ninth slot 22 and another end of the seventh one of the electrical jumpers 116 is secured to the bar conductor 24 of the first layer 48 in the forty-sixth slot 22. The fifth and sixth one of the electrical jumpers 112, 114 both connect the middle layer 46 and the inner layer 42, and the seventh one of the electrical jumpers 116 connects with the inner layer 42, to form the second winding path.

The first through seventh one of the electrical jumpers 104, 106, 108, 110, 112, 114, 116 are duplicated twice in different slot 22 locations about the stator core 20 for the embodiment of FIG. 9 as well. Therefore, the stator assembly 12 can further include an eighth one of the electrical jumpers, a ninth one of the electrical jumpers, a tenth one of the electrical jumpers, an eleventh one of the electrical jumpers, a twelfth one of the electrical jumpers, a thirteenth one of the electrical jumpers, a fourteenth one of the electrical jumpers, a fifteenth one of the electrical jumpers, a sixteenth one of the electrical jumpers, a seventeenth one of the electrical jumpers, an eighteenth one of the electrical jumpers, a nineteenth one of the electrical jumpers, a twentieth one of the electrical jumpers and a twenty-first one of the electrical jumpers.

The arrangement of the electrical jumpers 60 for the U phase 76 as discussed above for FIG. 9 is repeated for the V phase 78 with all of the slot 22 numbers increased by 120 electrical degrees. For the seventy-two slot 22, eight pole embodiment compatible with FIG. 9, the 120 electrical degrees is equal to an increase of six slots 22. Therefore, the location of the eighth, ninth, tenth, eleventh, twelfth, thirteenth and fourteenth one of the electrical jumpers, which is utilized for the V phase 78, is shifted by six slots 22. Additionally, the arrangement of the electrical jumpers 60 for the U phase 76 as discussed above for FIG. 9 is repeated for the W phase 80 with all of the slot 22 numbers increased by 240 electrical degrees. For the seventy-two slot 22, eight pole embodiment compatible with FIG. 9, the 240 electrical degrees is equal to an increase of twelve slots 22. Therefore, the location of the fifteenth, sixteenth, seventeenth, eighteenth, nineteenth, twentieth and twenty-first one of the electrical jumpers, which is utilized for the W phase 80, is shifted by twelve slots 22.

Three sets of three electrical jumpers 60 can be utilized to direct the current through the first, second and third winding paths in the respective U phase 76, V phase 78 and W phase 80. For example, the first through seventh one of the electrical jumpers 104, 106, 108, 110, 112, 114, 116 are located about the stator core 20 to direct the current flowing through the first, second and third winding paths in the U phase 76. Similarly, the eighth through fourteenth one of the electrical jumpers are located about the stator core 20 to direct the current flowing through the first, second and third winding paths in the V phase 78. Furthermore, the fifteenth through twenty-first one of the electrical jumpers are located about the stator core 20 to direct the current flowing through the first, second and third winding paths in the W phase 80. It is to be appreciated that the sets of three electrical jumpers 60 can be arranged differently than discussed immediately above, and the U, V, and W phases 76, 78, 80 can be arranged differently than discussed immediately above, and this is one suitable example.

The stator assembly 12 can also include a connection support structure 118 (see FIGS. 2, 3 and 5) that can support various electrical jumpers 60. For example, the connection support structure 118 has the first one of the electrical jumpers 86 and the second one of the electrical jumpers 88 attached thereto. The third one of the electrical jumpers 90 is separate from the connection support structure 118. In other words, the third one of the electrical jumpers 90 is not attached to the connection support structure 118. Said differently, the third one of the electrical jumpers 90 span from one bar conductor 24 to another bar conductor 24 independent of the connection support structure 118 (see FIGS. 2 and 3). Therefore, as shown in FIG. 2, when the connection support structure 118 is spaced from the stator core 20, the third one of the electrical jumpers 90 will remain coupled to the stator core 20. Similarly, the fourth and fifth one of the electrical jumpers 92, 94 is attached to the connection support structure 118 while the sixth one of the electrical jumpers 96 is separate from the connection support structure 118. Therefore, the sixth one of the electrical jumpers 96 span from one bar conductor 24 to another bar conductor 24 independent of the connection support structure 118 (see FIGS. 2 and 3). Furthermore, the seventh and eighth one of the electrical jumpers 98, 100 is attached to the connection support structure 118 while the ninth one of the electrical jumpers 102 is separate from the connection support structure 118. As such, the ninth one of the electrical jumpers 102 span from one bar conductor 24 to another bar conductor 24 independent of the connection support structure 118 (see FIGS. 2 and 3).

The connection support structure 118 can include a plurality of terminals 120 that can transfer current in and out of the stator core 20. In other words, the terminals 120 can direct current into the bar conductors 24 and through the stator core 20, and direct the current back out of the bar conductors 24 and away from stator core 20. The terminals 120 can be in electrical communication with the inverter.

The stator assembly 12 can further include a plurality of first stator connectors 122 (see FIGS. 2 and 3), with one or more of the terminals 120 being electrically connected to the first stator connectors 122 to direct or transfer current into the stator core 20. The first stator connectors 122 are attached to the connection support structure 118 and each of the first stator connectors 122 are attached to respective first sets of the bar conductors 24a to split the current into the parallel circuit arrangement for the first, second and third winding paths. Therefore, current into the stator core 20 through the start connection 82 can be through the first stator connectors 122. One of the first stator connectors 122 splits the current in the U phase 76, another one of the first stator connectors 122 splits the current in the V phase 78 and another one of the first stator connectors 122 splits the current in the W phase 80. Therefore, current in the U phase 76 enters one first set of the bar conductors 24a of respective winding paths of the stator core 20 through one of the first stator connectors 122, current in the V phase 78 enters another first set of the bar conductors 24a of respective winding paths of the stator core 20 through another one of the first stator connectors 122 and current in the W phase 80 enters yet another first set of the bar conductors 24a of respective winding paths of the stator core 20 through yet another one of the first stator connectors 122.

As best shown in FIG. 3, each of the first stator connectors 122 can include an inlet 124 to receive the current from one or more of the terminals 120. In addition, each of the first stator connectors 122 can include a plurality of first prongs 126 to split the current into the first set of the bar conductors 24a of the first, second and third winding paths. One of the first prongs 126 of each of the first stator connectors 122 are attached to respective bar conductors 24 in the first winding path, another one of the first prongs 126 of each of the first stator connectors 122 are attached to respective bar conductors 24 in the second winding path and yet another one of the first prongs 126 of each of the first stator connectors 122 are attached to respective bar conductors 24 in the third winding path. The first stator connectors 122 can be electrically connected to any suitable bar conductors 24 and the Figures illustrate one suitable arrangement.

The stator assembly 12 can further include a plurality of second stator connectors 128 (see FIGS. 2 and 3), with one or more of the terminals 120 being electrically connected to the second stator connectors 128 to direct or transfer current out of the stator core 20. The second stator connectors 128 are attached to the connection support structure 118 and each of the second stator connectors 128 attached to respective second sets of the bar conductors 24b to rejoin the current that has been split in each of the first, second and third winding paths into one respective outlet 130 to direct the current out of the stator core 20. Therefore, current out of the stator core 20 through the end connection 84 can be through the second stator connectors 128. One of the second stator connectors 128 rejoins the current in the U phase 76, another one of the second stator connectors 128 rejoins the current in the V phase 78 and another one of the second stator connectors 128 rejoins the current in the W phase 80. Therefore, current in the U phase 76 exits one second set of the bar conductors 24b of respective winding paths of the stator core 20 through one of the second stator connectors 128, current in the V phase 78 exits another second set of the bar conductors 24b of respective winding paths of the stator core 20 through another one of the second stator connectors 128 and current in the W phase 80 exits yet another second set of the bar conductors 24b of respective winding paths of the stator core 20 through yet another one of the second stator connectors 128.

As best shown in FIG. 3, each of the second stator connectors 128 can include the outlet 130 to transfer or direct the current out of the stator core 20. In addition, each of the second stator connectors 128 can include a plurality of second prongs 132 that rejoins the current split into the second set of the bar conductors 24b of the first, second and third winding paths. One of the second prongs 132 of each of the second stator connectors 128 are attached to respective bar conductors 24 in the first winding path, another one of the second prongs 132 of each of the second stator connectors 128 are attached to respective bar conductors 24 in the second winding path and yet another one of the second prongs 132 of each of the second stator connectors 128 are attached to respective bar conductors 24 in the third winding path. The second stator connectors 128 can be electrically connected to any suitable bar conductors 24 and the Figures illustrate one suitable arrangement.

The connection support structure 118 can further include an output bar 134 with the second stator connectors 128 attached to the output bar 134 in a spaced relationship. Specifically, the outlet 130 of each of the second stator connectors 128 is attached to the output bar 134. The output bar 134 electrically connects all of the second stator connectors 128 to form a wye connection. The output bar 134 is also electrically connected to one or more of the terminals 120. The output bar 134 can also be referred to as a neutral bar.

Various electrical jumpers 60 can cross each other (see FIGS. 3 and 5). At least one of these electrical jumpers 60 that cross can include an insulator 136 (as best shown in FIG. 3) disposed therebetween to prevent an undesirable electrical connection therebetween, i.e., to prevent a short circuit. For example, the first and second one of the electrical jumpers 86, 88 cross each other (see FIG. 5), and therefore, the first and/or second one of the electrical jumpers 86, 88 can include the insulator 136 therebetween. Similarly, the fourth and fifth one of the electrical jumpers 92, 94 cross each (see FIG. 5), and therefore, the fourth and/or fifth one of the electrical jumpers 92, 94 can include the insulator 136 therebetween. Furthermore, the seventh and eighth one of the electrical jumpers 98, 100 cross each other (see FIG. 5), and therefore, the seventh and/or eighth one of the electrical jumpers 98, 100 can include the insulator 136 therebetween. In addition, or alternatively, the electrical jumpers 60 that cross each other can be configured such that the electrical jumpers 60 are spaced from each other without utilizing the insulator 136.

As discussed above, the connection support structure 118 supports the first and second stator connectors 122, 128, the terminals 120, the output bar 134, and certain electrical jumpers 60, and these components are preassembled to the connection support structure 118. Therefore, during assembly of the stator assembly 12, the connection support structure 118 can be appropriately placed on the stator core 20 where the corresponding bar conductors 24 connections are located. When the connection support structure 118 is positioned on the stator core 20, then the connections can be welded together. For example, each of the first prongs 126 can be welded to the respective bar conductors 24, each of the second prongs 132 can be welded to the respective bar conductors 24, the electrical jumpers 60 can be welded to the respective bar conductors 24, etc. Furthermore, the outlets 130 can be welded to the output bar 134. The connection support structure 118 provides a quick connect instead of having to place each electrical jumper 60/the first and second stator connectors 122, 128 individually. Therefore, the connection support structure 118 can assist in making assembly of the stator assembly 12 efficient. It is to be appreciated that the embodiment of FIG. 9 can optionally utilize the connection support structure 118 and/or the first and second stator connectors 122, 128 in the desired location to accommodate this embodiment.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A stator assembly for an electric device, the stator assembly comprising:
   a stator core defining a plurality of slots spaced from each other;
   a plurality of bar conductors disposed in each of the slots and arranged to present a first winding path, a second winding path and a third winding path, with a first set of the bar conductors of the first, second and third winding paths configured to receive current in a parallel circuit arrangement;
   a plurality of electrical jumpers electrically connected to a predetermined number of the bar conductors to route the current through the respective first, second and third winding paths such that an amount of the current in one cycle flowing through the first winding path and the third winding path is substantially the same and an amount of the current in one cycle flowing through the second winding path is different from the amount of the current in the one cycle flowing through the first and third winding paths;
   wherein:
      the amount of the current flowing through the first winding path defines a first waveform, the amount of the current flowing through the second winding path defines a second waveform and the amount of the current flowing through the third winding path defines a third waveform;
      the first and third waveforms are substantially the same and the second waveform is different from the first and third waveforms;
      the amount of the current flowing through each of the first and third winding paths is greater than the amount of the current flowing through the second winding path;
      a peak amplitude of the first and third waveforms occurs in time before a peak amplitude of the second waveform such that the first and third waveforms are different from the second waveform; and
      the peak amplitude of the current of the second waveform is less than the peak amplitude of the current of the first and third waveforms.

2. The assembly as set forth in claim 1 wherein heat being produced in the first and third winding paths is greater than heat being produced in the second winding path due to the amount of the current flowing through the first and third winding paths being greater than the amount of the current flowing through the second winding path.

3. The assembly as set forth in claim 1 wherein:
   the stator core extends between a first end and a second end along a longitudinal axis, and the stator core includes an inner wall defining a hole along the longitudinal axis such that the inner wall is spaced radially away from the longitudinal axis, and wherein the stator core includes an outer wall opposing the inner wall;
   the slots are spaced from each other radially about the longitudinal axis and each extends between the first and second ends of the stator core;
   each of the slots includes an inner layer of the bar conductors disposed proximal to the inner wall, an outer layer of the bar conductors disposed proximal to the outer wall and spaced from the inner layer and a middle layer of the bar conductors disposed between the inner and outer layers; and
   a first one of the electrical jumpers connects the inner and outer layers to form the first winding path, a second one of the electrical jumpers connects the inner and outer layers to form the third winding path and a third one of the electrical jumpers connects the middle layer to form the second winding path.

4. The assembly as set forth in claim 3 wherein:
   the inner layer of each of the slots includes a first layer and a second layer;
   the middle layer of each of the slots includes a third layer and a fourth layer;
   the outer layer of each of the slots includes a fifth layer and a sixth layer; and
   the first, second, third, fourth, fifth and sixth layers are arranged in a row from the inner wall outwardly to the outer wall such that the first layer is disposed proximal to the inner wall and the sixth layer is disposed proximal to the outer wall.

5. The assembly as set forth in claim 4 wherein:
   a first one of the electrical jumpers is secured to the bar conductor of the first layer of one of the slots and the first one of the electrical jumpers is secured to the bar conductor of the sixth layer of another one of the slots to cross the current between the inner and outer layers; and
   a second one of the electrical jumpers is secured to the bar conductor of the second layer in the same slot that has the first one of the electrical jumpers secured to the bar conductor of the sixth layer and the second one of the electrical jumpers is secured to the bar conductor of the fifth layer in the same slot that has the first one of the electrical jumpers secured to the bar conductor of the first layer to cross the current between the inner and outer layers.

6. The assembly as set forth in claim 5 wherein a third one of the electrical jumpers is secured to the bar conductor of the fourth layer in the same slot that has the first one of the electrical jumpers secured to the bar conductor of the sixth layer and the third one of the electrical jumpers is secured to the bar conductor of the third layer in the same slot that has the first one of the electrical jumpers secured to the bar conductor of the first layer.

7. The assembly as set forth in claim 6 further including a connection support structure having the first one of the electrical jumpers and the second one of the electrical jumpers attached thereto, with the third one of the electrical jumpers being separate from the connection support structure.

8. The assembly as set forth in claim 7 further including a plurality of first stator connectors attached to the connection support structure and each of the first stator connectors are attached to respective first sets of the bar conductors to split the current into the parallel circuit arrangement for the first, second and third winding paths, and wherein one of the first stator connectors splits the current in a U phase, another one of the first stator connectors splits the current in a V phase and another one of the first stator connectors splits the current in a W phase.

9. The assembly as set forth in claim 1 wherein:
the electric device includes a housing and a rotor rotatably supported by the housing;
the stator assembly is supported by and fixed relative to the housing;
each of the slots includes an inner layer of the bar conductors having a first layer and a second layer, an outer layer of the bar conductors spaced from the inner layer, and a middle layer of the bar conductors disposed between the inner and outer layers, with the middle layer of each of the slots including a third layer and a fourth layer, and the outer layer of each of the slots including a fifth layer and a sixth layer; and
the first, second, third, fourth, fifth and sixth layers are arranged in a row.

10. The assembly as set forth in claim 1 further including a connection support structure that supports one of the electrical jumpers.

11. A stator assembly for an electric device, the stator assembly comprising:
a stator core defining a plurality of slots spaced from each other;
a plurality of bar conductors disposed in each of the slots and arranged to present a first winding path, a second winding path and a third winding path, with a first set of the bar conductors of the first, second and third winding paths configured to receive current in a parallel circuit arrangement;
a plurality of electrical jumpers electrically connected to a predetermined number of the bar conductors to route the current through the respective first, second and third winding paths such that an amount of the current in one cycle flowing through the first winding path and the third winding path is substantially the same and an amount of the current in one cycle flowing through the second winding path is different from the amount of the current in the one cycle flowing through the first and third winding paths;
wherein:
the amount of the current flowing through the first winding path defines a first waveform, the amount of the current flowing through the second winding path defines a second waveform and the amount of the current flowing through the third winding path defines a third waveform;
the first and third waveforms are substantially the same and the second waveform is different from the first and third waveforms;
the amount of the current flowing through each of the first and third winding paths is less than the amount of the current flowing through the second winding path;
a peak amplitude of the first and third waveforms occurs in time after a peak amplitude of the second waveform such that the first and third waveforms are different from the second waveform; and
the peak amplitude of the current of the second waveform is greater than the peak amplitude of the current of the first and third waveforms.

12. The assembly as set forth in claim 11 wherein:
the stator core extends between a first end and a second end along a longitudinal axis, and the stator core includes an inner wall defining a hole along the longitudinal axis such that the inner wall is spaced radially away from the longitudinal axis, and wherein the stator core includes an outer wall opposing the inner wall;
the slots are spaced from each other radially about the longitudinal axis and each extends between the first and second ends of the stator core;
each of the slots includes an inner layer of the bar conductors disposed proximal to the inner wall, an outer layer of the bar conductors disposed proximal to the outer wall and spaced from the inner layer and a middle layer of the bar conductors disposed between the inner and outer layers;
a first one of the electrical jumpers and a second one of the electrical jumpers respectively connect the outer layer and the middle layer, and connect the inner layer and the middle layer to form the first winding path;
a third one of the electrical jumpers and a fourth one of the electrical jumpers respectively connect the outer layer and the middle layer, and connect the inner layer and the middle layer to form the third winding path; and
a fifth one of the electrical jumpers and a sixth one of the electrical jumpers both connect the middle layer and the inner layer, and a seventh one of the electrical jumpers connect with the inner layer to form the second winding path.

13. The assembly as set forth in claim 11 wherein:
the electric device includes a housing and a rotor rotatably supported by the housing;
the stator assembly is supported by and fixed relative to the housing;
each of the slots includes an inner layer of the bar conductors having a first layer and a second layer, an outer layer of the bar conductors spaced from the inner layer, and a middle layer of the bar conductors disposed between the inner and outer layers, with the middle layer of each of the slots including a third layer and a fourth layer, and the outer layer of each of the slots including a fifth layer and a sixth layer; and
the first, second, third, fourth, fifth and sixth layers are arranged in a row.

14. The assembly as set forth in claim 11 wherein:
the stator core extends between a first end and a second end along a longitudinal axis, and the stator core includes an inner wall defining a hole along the longitudinal axis such that the inner wall is spaced radially away from the longitudinal axis, and wherein the stator core includes an outer wall opposing the inner wall;
the slots are spaced from each other radially about the longitudinal axis and each extends between the first and second ends of the stator core; and
each of the slots includes an inner layer of the bar conductors disposed proximal to the inner wall, an outer layer of the bar conductors disposed proximal to the outer wall and spaced from the inner layer and a middle layer of the bar conductors disposed between the inner and outer layers.

15. The assembly as set forth in claim 14 wherein:
the inner layer of each of the slots includes a first layer and a second layer;
the middle layer of each of the slots includes a third layer and a fourth layer;
the outer layer of each of the slots includes a fifth layer and a sixth layer; and
the first, second, third, fourth, fifth and sixth layers are arranged in a row from the inner wall outwardly to the outer wall such that the first layer is disposed proximal to the inner wall and the sixth layer is disposed proximal to the outer wall.

16. The assembly as set forth in claim 11 further including a connection support structure that supports one of the electrical jumpers.

17. The assembly as set forth in claim 16 further including a plurality of first stator connectors attached to the connection support structure, and each of the first stator connectors are attached to respective first sets of the bar conductors to split the current into the parallel circuit arrangement for the first, second and third winding paths, and wherein one of the first stator connectors splits the current in a U phase, another one of the first stator connectors splits the current in a V phase and another one of the first stator connectors splits the current in a W phase.

18. A stator assembly for an electric device, the stator assembly comprising:
   a stator core defining a plurality of slots spaced from each other;
   a plurality of bar conductors disposed in each of the slots and arranged to present a first winding path, a second winding path and a third winding path, with a first set of the bar conductors of the first, second and third winding paths configured to receive current in a parallel circuit arrangement;
   a plurality of electrical jumpers electrically connected to a predetermined number of the bar conductors such that an amount of the current flowing through the first winding path and the third winding path is substantially the same and an amount of the current flowing through the second winding path is different from the amount of the current flowing through the first and third winding paths; and
   wherein:
      the stator core extends between a first end and a second end along a longitudinal axis, and the stator core includes an inner wall defining a hole along the longitudinal axis such that the inner wall is spaced radially away from the longitudinal axis, and wherein the stator core includes an outer wall opposing the inner wall;
      the slots are spaced from each other radially about the longitudinal axis and each extends between the first and second ends of the stator core;
      each of the slots includes an inner layer of the bar conductors disposed proximal to the inner wall, an outer layer of the bar conductors disposed proximal to the outer wall and spaced from the inner layer and a middle layer of the bar conductors disposed between the inner and outer layers; and
      a first one of the electrical jumpers connects the inner and outer layers to form the first winding path, a second one of the electrical jumpers connects the inner and outer layers to form the third winding path and a third one of the electrical jumpers connects the middle layer to form the second winding path.

19. The assembly as set forth in claim 18 wherein the amount of the current flowing through each of the first and third winding paths is greater than the amount of the current flowing through the second winding path.

20. The assembly as set forth in claim 18 wherein:
   the amount of the current flowing through the first winding path defines a first waveform, the amount of the current flowing through the second winding path defines a second waveform and the amount of the current flowing through the third winding path defines a third waveform;
   the amount of the current flowing through each of the first and third winding paths is greater than the amount of the current flowing through the second winding path;
   a peak amplitude of the first and third waveforms occurs in time before a peak amplitude of the second waveform such that the first and third waveforms are different from the second waveform; and
   the peak amplitude of the current of the second waveform is less than the peak amplitude of the current of the first and third waveforms.

* * * * *